Dec. 3, 1957     J. E. HECKETHORN     2,814,862
METHOD OF MAKING A HOSE COUPLING
Filed Aug. 25, 1955

INVENTOR.
John E. Heckethorn
BY
ATTORNEY

United States Patent Office 2,814,862
Patented Dec. 3, 1957

2,814,862

METHOD OF MAKING A HOSE COUPLING

John E. Heckethorn, Denver, Colo., assignor to Heckethorn Manufacturing & Supply Co., Littleton, Colo.

Application August 25, 1955, Serial No. 530,588

1 Claim. (Cl. 29—443)

This invention relates to a hose coupling, and more particularly to a method for manufacturing the said hose coupling.

The female portion of a conventional hose coupling consists of a tubular nipple, adapted to be inserted in the extremity of a length of hose, with a sleeve-like internally threaded coupling sleeve mounted on the nipple by spinning the extremity of the nipple radially outward to form a retaining flange for the sleeve. This method of manufacturing has several disadvantages, for instance, the nipple must be machined extra long to provide metal for spinning the flange thereon and the spinning of the extremity to form the retaining flange results in a rounded washer seat against which it is difficult to obtain a perfect seat or seal for a washer when the sleeve is screwed onto the male portion of the coupling.

The principal object of this invention is to provide a method for securing the coupling sleeve on the female portion of a hose coupling which will avoid the waste of metal usually required for spinning a retaining flange and which will provide a relatively wide, perfectly flat, annular washer seat against which a perfect washer seal can be always maintained.

A further object is to provide a method that is highly efficient in securing the extremity of a hose in a coupling without the use of external hose clamps of any kind, and to provide a hose-securing means which can be quickly and easily removed and replaced on a hose with the use of a simple wrench-type tool, and which, when in place on the hose, will withstand extreme pressures without separation from the hose.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

Figure 1:
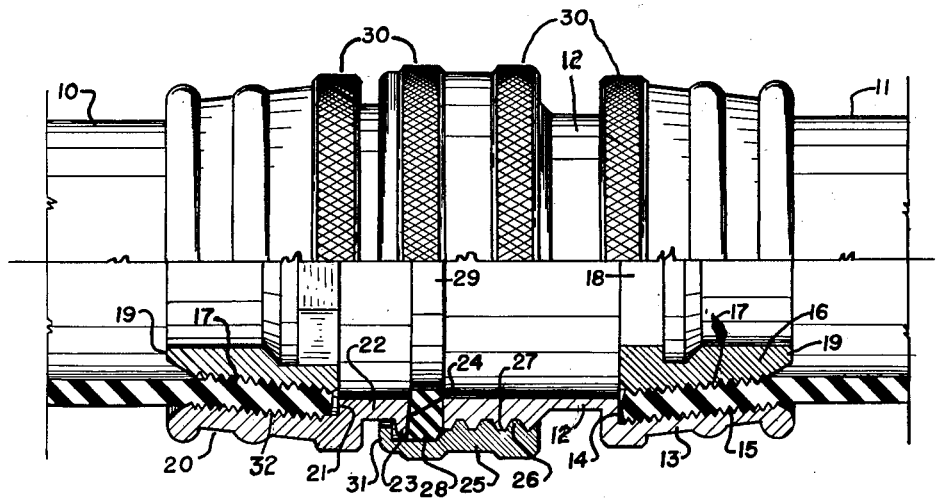
Fig. 1 is a combined side view and longitudinal section of the complete improved hose coupling as it would appear in use and in place on lengths of hose.

In the drawing, the terminals of two lengths of hose to be coupled by the improved coupling are illustrated at 10 and 11. The coupling comprises a male portion adapted to be secured to one hose length, for instance the hose 11, and a female portion adapted to be secured to the other hose length, for instance the hose 10.

The male portion consists of a hollow nipple 12 formed on a conical hose-receiving cup 13. Standard hose coupling threads 27 are formed on the extremity of the nipple distant from the cup 13. The cup 13 is of larger internal diameter than the nipple 12 so as to provide an internal annular shoulder 14. The interior of the cup 13 is provided with relatively sharp internal threads 15, the threads increasing in diameter from the open extremity of the cup 13 to the shoulder 14 so as to provide a roughened conical internal surface.

The extremity of the hose 11 is expanded against the above internal conical surface by screwing a conical, threaded wedge bushing 16 into the open extremity of the hose length 11. The conical surface of the bushing 16 is provided with relatively sharp external threads 17. The larger extremity of the bushing is formed with an internal hexagonal wrench socket 18, and the smaller extremity is tapered to provide a relatively sharp entering end 19.

The male portion of the improved coupling is installed on the hose 11 by slipping the cup 13 over the extremity of the hose until the latter contacts the shoulder 14. The entering extremity 19 of the bushing 16 is inserted through the cup 13 and forced into the end of the hose 11. The bushing is now rotated by means of any suitable hexagonal wrench so that the threads 17 will indent and thread into the extremity of the hose to gradually expand the latter into the threads 15 of the cup 13. When the bushing is in its final position, the extremity of the hose is belled or flared outwardly and firmly embedded in the threads 15 and 17, as shown at the left of Fig. 1.

The female portion of the improved coupling employs a conical cup 20 provided with relatively sharp internal threads 32 similar to the cup 13 of the male portion, and has an internal hose-receiving shoulder 21 similar to the shoulder 14. A collar portion 22 is formed on the cup 20 abutting the shoulder 21. The collar portion 22 is formed with an annular external peripheral collar flange 23.

A coupling sleeve 25 is rotatably fitted over the flange 23 and the extremity of the collar portion 22. The sleeve 25 is provided with standard internal hose coupling threads 26 adapted to thread onto the threads 27 of the male nipple 12. It is also provided with an internal peripheral sleeve flange 31 which extends behind the flange 23 to retain the sleeve 25 in place on the collar portion 22.

An internal washer channel 28 of larger diameter than the root diameter of the threads 26 is formed in the sleeve 25 between the threads 26 and the flange 31. This channel is for the purpose of receiving and maintaining a resilient washer 29 in place in the sleeve 25 and for receiving the peripheral flange 23 of the collar portion 22. Since the sleeve 25 is rotatable about the collar portion 22, it may be readily threaded onto the male nipple 12 so that the washer 29 will be with the latter in tight clamped position between the nipple 12 and a washer seat 24 on the extremity of the collar 22.

The hose 10 is mounted in the cup 20 of the female portion of the coupling by means of one of the wedge bushings 16, as previously described with reference to the male portion of the coupling. The cups 13 and 20 and the sleeve 25 are preferably provided with knurled bands 30 to facilitate hand gripping.

Figure 2:
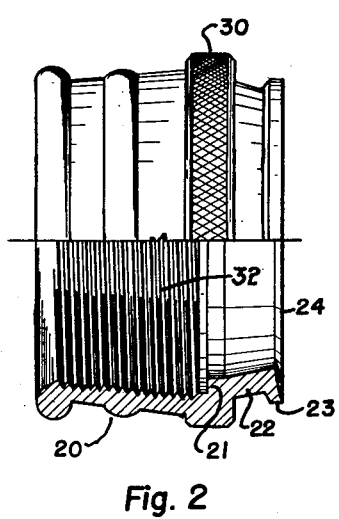
Fig. 2 is a similar view illustrating a hose-encircling sleeve as employed in the female portion of the coupling of Fig. 1, as it would appear during one step in the method of manufacture.
Figure 3:
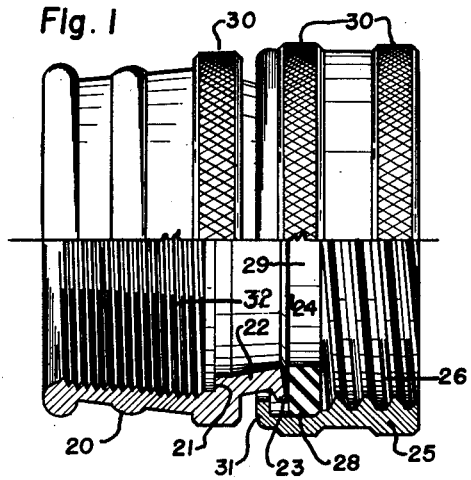
Fig. 3 is a similar view illustrating the completed female portion of the improved coupling, illustrating another step in the manufacture thereof.
Figure 4:
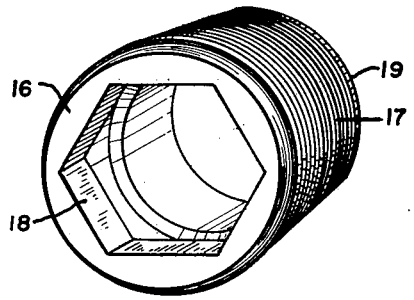
Fig. 4 is a perspective view of a wedge bushing of the type employed in the improved coupling for securing a hose extremity therein.

One of the principal features of this invention relates to the method of placing the external flange 23 in the washer channel 28 behind the internal flange 31. It can be seen that, since the external diameter of the flange 23 in the finished coupling exceeds the internal diameter of the flange 31, it would be impossible to place the sleeve 25 in position over the flange 23 with the two flanges in their finished position. This is accomplished in the present method, however, by initially forming the interior and exterior surfaces of the collar portion 22 so that they are inclined axially inward, as shown in Fig. 2, so that the initial outer diameter of the external flange 23 is less than the internal diameter of the internal flange 31. This allows the sleeve 25 to be easily slipped over the collar portion 22, as shown in Fig. 3. After the sleeve 25 is in position, the collar portion 22 is expanded to a cylindrical shape which will, of course, expand the flange 23 into the channel 28 to permanently retain the sleeve 25 in place. The surface of the extremity of the collar portion 22 and the surface of the side of the collar flange 23 form the seat for the washer 29. The surfaces are initially formed on the incline of a cone having its apex positioned within the collar portion 22 as shown in Figs. 2 and 3. The incline of the cone is such that when the collar extremity is fully expanded, these surfaces will be brought to a perfectly flat position lying in a plane at right angles to the axis of the collar.

The expanding of the collar portion may be accomplished in any suitable shop procedure, such as by rotating the cup 20 and spinning the collar outwardly with any suitable spinning tool, or the collar may be expanded by means of a tapered plug which when forced through the collar portion 22 will expand the collar portion to the proper diameter within the sleeve 25. The plug can be mounted in a suitable punch press provided with a stripper so that when the plug descends, it will pass through and expand the collar portion 22 into the sleeve 25 and as it ascends, the stripper will strip the joined assembly from the plug.

It will be noted that by this method of manufacture the coupling portion 20—22 need not be of extra length for flange spinning purposes so that waste of metal is avoided. It will also be noted that the sealing washer surface 24 is relatively wide and perfectly flat so that an efficient seal is obtained against the washer 29.

While a specific form of the improvement has been described and illustrated herein, it is desired to be understood that the same may be varied, within the scope of the appended claim, without departing from the spirit of the invention.

Having thus described the invention, what is claimed and desired secured by Letters Patent is:

In the female portion of a hose coupling, a method of securing a hose terminal collar, having an outwardly projecting collar flange, into an internally threaded sleeve, having an inwardly projecting sleeve flange, with the two flanges interlocking to rotatably retain said sleeve on said collar, and with the collar and its collar flange forming a flat washer seat lying in a plane at right angles to the axis of said collar, comprising: forming the portion of said collar carrying said collar flange of less external diameter than the remainder of said collar so that the external diameter of said collar flange will be less than the internal diameter of said sleeve flange; forming the annular surface of the extremity of the collar which carries the collar flange on the incline of a cone having its apex within said collar; inserting said collar flange through said sleeve flange into said sleeve; thence expanding the portion of the collar carrying the collar flange uniformly and radially outward until the conical annular surface on the extremity of the collar lies in a plane at right angles to the axis of said collar to form a flat washer seat.

References Cited in the file of this patent

UNITED STATES PATENTS

| | | |
|---|---|---|
| 402,219 | Austin | Apr. 30, 1889 |
| 795,796 | Gottwald | July 25, 1905 |
| 1,610,165 | Schellin | Dec. 7, 1936 |
| 2,360,761 | Clickner | Oct. 17, 1944 |
| 2,386,109 | Glessner | Oct. 2, 1945 |
| 2,417,350 | Conroy | Mar. 11, 1947 |

FOREIGN PATENTS

| | | |
|---|---|---|
| 183,493 | Great Britain | Aug. 3, 1922 |